United States Patent [19]
Thomas

[11] 3,871,392
[45] Mar. 18, 1975

[54] DENTAL FLOSS HOLDER
[75] Inventor: William Burnie Thomas, Carrollton, Tex.
[73] Assignee: John H. Sparling, Texarkana, Tex. ; a part interest
[22] Filed: July 19, 1973
[21] Appl. No.: 380,561

Related U.S. Application Data
[63] Continuation of Ser. No. 206,652, Dec. 10, 1971, abandoned.

[52] U.S. Cl. .............................................. 132/89
[51] Int. Cl. ........................................... A61c 15/00
[58] Field of Search .................... 132/89, 91, 92, 93

[56] References Cited
UNITED STATES PATENTS
| | | | |
|---|---|---|---|
| 1,239,633 | 9/1917 | Stickler | 132/92 R |
| 1,364,367 | 1/1921 | Goodrich | 132/91 |
| 1,882,204 | 10/1932 | Zrna | 132/91 |
| 2,354,454 | 7/1944 | Geffner | 132/91 |

Primary Examiner—G. E. McNeill
Attorney, Agent, or Firm—Hubbard, Thurman, Turner & Tucker

[57] ABSTRACT

A dental floss holder for removing plaque and food particles from between the teeth is disclosed. A handle supports a shank from which extend two prongs in a generally U-shaped configuration disposed angularly with respect to the handle. The tips of the prongs are slotted, through which the floss is threaded. The shank portion of the handle is oppositely grooved to permit the ends of a string of floss to be wrappingly secured therearound. A guide channel extends from adjacent the slotted tips to the grooved shank to facilitate threading and gripping of the floss.

9 Claims, 6 Drawing Figures

PATENTED MAR 18 1975   3,871,392

DENTAL FLOSS HOLDER

This is a continuation of application, Ser. No. 206,652, now abandoned, filed Dec. 10, 1971.

BACKGROUND OF THE INVENTION

The present invention relates to oral hygiene device. More particularly, the present invention relates to a device for securing a string of dental floss, which device is manually manipulative by the user to remove plaque and food particles lodged between the teeth.

The formation of plaque in the mouth is known to be one of the major causes of tooth decay and periodontal disease. Plaque is a filmy substance formed along the surfaces of the teeth near the gum line by the mouth tissues. As well as being displeasing in appearance, plaque is an excellent breeding ground for bacteria. Food particles lodged between the teeth are acted upon by microbes and bacteria in the plaque layer, and over a period of time, are converted into waste products such as toxic acids. The production of an accumulation of toxic acids will attack and dissolve the tooth enamel and eat into the tooth structure. If left unattended, this destructive process will result in tooth damage and cavities.

Other harmful effects are also the result of the formation of microbal plaque. The toxic waste may also irritate and attack the gum tissue ultimately weakening and destroying it. If left untreated, these conditions can continue until periodontal disease such as pyorrhea develops. At this stage, loss of teeth and deterioration of the supporting bone structure can result.

The avoidance of the aforementioned dental problems lies in a preventive program of oral hygiene. It is recommended by most dentists that teeth should be rinsed or preferably brushed after every meal to remove food accumulations from the mouth. However, it is recognized that even the most vigorous brushing can not reach all areas between the teeth. Therefore, effective oral hygiene requires that the brushing program be supplemented with the use of dental floss to remove food particles compacted between the teeth.

Dental floss is a string-like waxed or unwaxed material which usually comes in rolls or spools. Generally, the user severs a length of the string from the spool, and then holding opposite ends between the thumb and index finger with both hands manipulates the string between adjacent teeth to remove food debris. Such a procedure, while effective, is often extremely difficult. Rear teeth are extremely hard to reach; the floss is hard to grasp with the fingers; and awkward maneuvering results in slipping and cutting of the gum tissues. Consequently, many people, although recognizing the advantages to be gained from flossing the teeth, do not regularly practice this procedure. Thus, it appears highly desirable to provide improved means to enable users to easily and effectively perform the flossing operation.

To this end, a number of dental floss holders have been developed. Many of these were either bulky and therefore difficult to manipulate or expensive to manufacture. To overcome these difficulties, more recent dental floss holders rely upon designs having a handle and extending prongs which secure the floss in bow fashion permitting the user to draw the string between the teeth. While these designs generally provide a structure which is easy to manipulate within the mouth, other problems result. For example, the means engaging the floss permits slip and loss of tension of the tooth engaging floss portion making use difficult and ineffective. In an attempt to effectively secure the dental floss to the holder, various solutions are to be found in the prior art. The most commonly used consists of a notched or slotted button secured to the handle of the device. The user then secured the free ends of the string of floss to the button by winding the ends therearound.

Certain problems, both in manufacture and use, arise from designs of this type. Winding of the ends of the floss around a relatively small button or other anchor is sometimes difficult requiring great manual dexterity and, in spite of this, the floss may eventually work loose. If the anchor is made large enough to facilitate ease of winding, it presents an unnecessary and perhaps dangerous projection should the device slip while pressure is being applied by the user. Also, the manufacture of the device is more costly, as additional fabrication and assembly steps are required to affix the button to the device.

The present invention overcomes the aforementioned inadequacies of the prior art dental floss holders. The present device provides a dental floss holder which is unitary in structure and may be easily manufactured. The means for securing the dental floss and the holder are integral in the unit and provide a positive grip on the floss. Threading of the holder is easily accomplished in a natural movement by the user. The holder is configured to be easily accommodated within the mouth and permit thorough, effective polishing and scraping of the teeth.

Other objects and advantages of the present invention will become apparent from the following specification, drawings and claims.

SUMMARY OF THE INVENTION

In accordance with the preferred embodiment, this invention comprise a dental floss holder having a handle which supports a shank at its upper end. Two generally U-shaped prongs angular with respect to the handle, extend from the shank. The tips of the prongs are slotted to accept dental floss. Opposite grooves are provided in the shank portion to secure the ends of the floss and a guide channel extends from adjacent the slot in each prong to adjacent the grooves.

The user can easily thread the holder by engaging a piece of floss in one slot and draw the floss along the opposite channel, across the prongs through their respective slots, and return along the associated channel to the other slot. The device of the present invention is unitary, thus is of a design lending itself to fabrication. As well as having important functional features described, the dental floss holder of the present invention is of aesthetically pleasing design.

DESCRIPTION OF THE DRAWINGS

A more complete understanding of the invention may be had by referring to the following detailed description when taken in conjunction with the drawings, wherein.

Referring now to the drawings wherein like numerals designate like parts throughout the several views.

Figure 3:
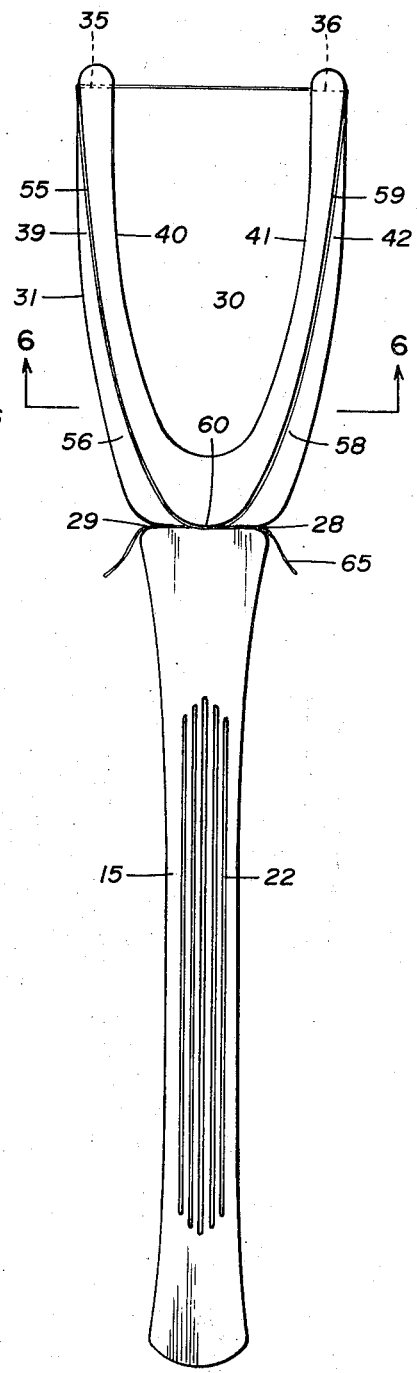
FIG. 3 is a view of the bottom side of the holder of the present invention showing a piece of dental floss secured in the holder.
Figure 4:
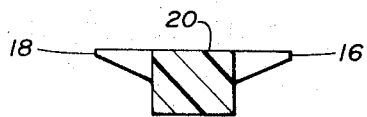
FIG. 4 is a sectional view taken along lines 4—4 of FIG. 1.

The dental floss holder of the present invention is generally designated by the numeral 10 and comprises a handle section 11, intermediate shank section 14, and fork end section 12. These sections are integrally formed as a unit with the shank being the general area of transition between the handle and the form end. The handle 11 is generally thin and elongated having a generally flat bottom side 15 which extends through the shank section to join with work section 12. The opposite edges of the bottom 15 are slightly concave to provide a comfortable gripping area. A series of longitudinally extending ribs 22, five are shown in FIG. 3, are provided on the surface of underside 15 and geometrically arranged thereon.

Figure 5:
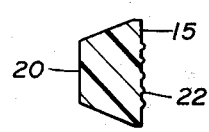
FIG. 5 is a sectional view of the handle taken along lines 5—5 of FIG. 2.

The upper surface of the handle has a longitudinal rib 20 which extends to connect at its forward end with fork section 12. Rib section 20 is narrower than underside 15, therefore sides 16 and 18 of the handle slant slightly inwardly and upwardly giving the handle a generally trapezoidal cross-section best seen in FIG. 5. The end 19 of the handle is rounded and tapers upwardly to the end of rib section 20. The smooth, rounded end 19 enhances the appearance of the handle as well as eliminating sharp potentially dangerous corners. While it will be obvious to provide other configurations for the handle, the design described above is particularly advantageous. The handle has an overall pleasing appearance which should appeal to potential buyers. Further, the elongated shape, slightly concave and being trapezoidal in cross-section, lends itself to grasp by most users. The ribs 22 on the underside also lend to the aesthetic value of the design as well as functionally providing an increased gripping surface. The design of the handle is particularly important since manipulation of the floss is often vigorous and the possibility of the holder slipping in the hand of the user is often compounded as the holder and fingers are sometimes wetted by saliva, and become slippery.

Figure 1:
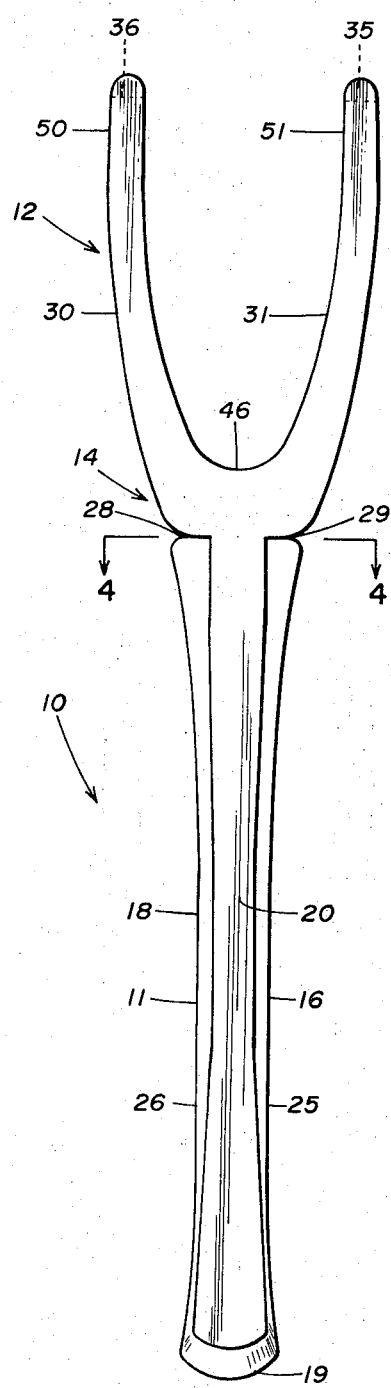
FIG. 1 is a top view of the dental floss holder of the present invention.
Figure 2:
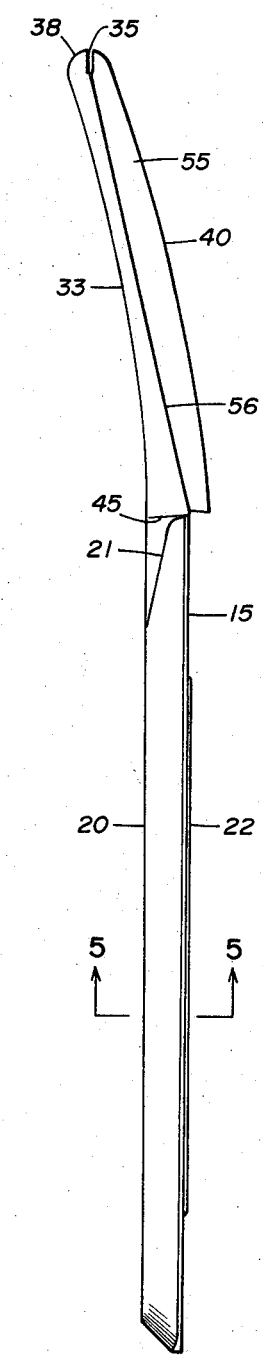
FIG. 2 is a side view of the dental floss holder shown in FIG. 1.

The shank section 14 is that portion of the holder generally including the upper end of handle 11 and the adjacent bottom portion of fork 12. As best seen in FIG. 2, handle sides 16 and 18 gradually taper downwardly in the shank area from the upper rib 20 and terminate in a rounded end. Since the base 15 is widest at this section, the sides 16 and 18 are flanges outwardly from center rib section 20.

Opposite notches 28 and 29 are provided in shank section 14. The notches generally extend inwardly in a V-shape toward the longitudinal center line of the handle to a depth approximately corresponding to the sides of rib 20. The outer opening of each of the notches is amply rounded oppositely extending toward the fork and handle. The inner ends of the notches are only several thousandths in width so that, as will more fully be explained hereafter, they will tightly engage one or several strands of dental floss. The notches 28 and 29, as seen in FIG. 2, are defined by the rounded end of tapered portion 21 and oppositely by full depth shoulder portion 45 of fork section 12.

The fork section 12, as explained above, joins the upper end of handle 11 at the shank section 14. Fork 12 includes two spaced apart arms 30 and 31 which are mirror images of one another each curving slightly outwardly and terminating in a straight end section 50 and 51, respectively, which are generally parallel to one another and to the longitudinal axis of the handle. A generally U-shaped opening 46 is defined between arms 30 and 31 which provides ample clearance so that the floss can be manipulated between the teeth without interference by the arms 30 and 31.

Looking at FIG. 2, it will be seen that the plane of fork section 12 is angularly disposed with respect to the handle with the top of the rib 20 and the upper surface 33 of the fork generally defining an obtuse angle. The upper surface 33 of the fork is slightly convex between the shank and the outer end of the arms 30 and 31. This configuration and relative position of the fork makes the holder especially effective and manipulative facilitating access to all areas within the mouth.

Laterally disposed slots 35 and 36 are provided in the ends of each of the arms 31 and 30, respectively. The width and depth of slots 35 and 36 are chosen to permit snug insertion of a strand of floss therein so that a string of floss can be securely attached between the arms spanning opening 46.

A generally U-shaped channel extends along the outer periphery of the underside of fork 12. The channels 39 and 42 are defined by planar bottom walls 56 and 58 which extend from adjacent grooves 28 and 29, respectively, to the outer lateral opening of slots 36 and 35, respectively. Channels 39 and 42 are also defined by downwardly depending rib walls 55 and 59 which also extend from the lateral extremities of slots 35 and 36 to the shank portion 14. Looking at FIGS. 3 and 6, it will be seen that these rib walls 55 and 59 diverge inwardly so that channels 39 and 42 increase in width as they approach the shank portion 14. Rib walls 55 and 59 also project at the shank portion below bottom side 15 and have underside 40 which curves convexly to the rounded end 38 of each of the arms. Each arm 30 and 31 of the fork is thus provided on its underside with a channel smoothly extending from the outer extremity of each of the slots 35 and 36 to adjacent grooves 28 and 29. The channels 39 and 42 are continuously joined at the shank across radius 60.

Figure 6:
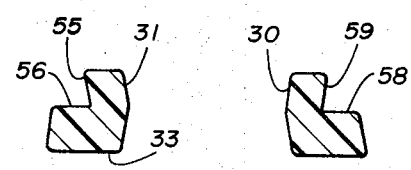
FIG. 6 is a sectional view of the prongs taken along lines 6—6 of FIG. 3.

Referring to FIG. 6, it will be seen that walls 55 and 59 and bottom walls 56 and 58, respectively, defining the channels 39 and 42, form an acute angle with one another. This angularity, along with the shape of channels 39 and 42, greatly facilitates stringing dental floss in the holder, as will be more fully described hereafter.

The dental floss holder of the present invention provides a number of advantages including ease of fabrication. The design of the unit, described above, is unitary and lends itself to fabrication by molding. The unit may be injection molded as an integral unit requiring no additional fabrication or procedures such as the assembly of additional parts. A number of plastics would be suitable as a material, characteristically having high strength and rigidity and high resistance to acids and other substances. Typical of plastics having these characteristics would be ABS.

The construction and advantages of the novel dental floss holder herein described will be better understood in the following description of use of the holder.

The user severs a length of floss, approximately 10 to 12 inches, from the dispensing spool. The length of floss, designated by numeral 65 in FIG. 3, is attached to the holder by inserting it into slots 35 and 36 of the arms and pulling it tight with about equal free lengths extending on either side. This can easily be done with one hand while the other hand grips the handle. The free end extending from slot 35 is drawn along channel 39, around radius 60 and engaged in opposite groove 28 at the shank. For extra security, the end may be wrapped around the upper side of the holder and also inserted in notch 29. Similarly, the free end of floss extending from slot 36 will be drawn along channel 42 and secured in notch 29, pulling the floss taut. The end may also be further wrapped around the shank portion and additionally engaged in slot 28. Similarly, it would be possible to string the holder in one continuous motion starting at a groove and preceeding along the opposite channel, across the end slots 35 and 36, and return to the other notch via the other channel.

The pull exerted against the working section of floss when engaged with the teeth is absorbed at the slots, along the channels, at radiused shoulder 60, and at the opposing notches 28 and 29 insuring against slipping or loosening of the floss. This design provides multiple points of engagement of the floss and holder, thus distributing the loads. Multiple wrapping of the floss ends about the shank and grooves may also further secure the floss for extra strenuous or vigorous use. To use the holder, the patient now grasps the holder by the handle, for example, if it is desired to floss between the upper molars the thumb would be placed on the underside 15 along the ribs 16 with the fingers curled around the upper side of the handle so that the forked end 12 curves upwardly. The fork 12 is inserted into the mouth of the user to the appropriate location along the upper row of teeth. While looking in a mirror, the floss strung between the arms is engaged between the appropriate teeth and gently worked down into the contact zone between the teeth in a back-and-forth manner. The shape of the holder provides easy manipulation and the holder may easily be positioned within the mouth. Once the contact area between the teeth has been adequately polished or scraped so that the food particles are removed, the holder may be disengaged from the teeth in the same manner as it was inserted. Should the dental floss become lodged or stuck between the teeth, making removal of the holder difficult, the user can simply unwind one end of the floss from around the handle and draw the string to one side of the teeth. The holder and floss should be rinsed frequently during use to remove particles clinging to them. When the holder is removed from the mouth, the string of floss may be removed easily and replaced with another fresh piece. Should it be desired to perform the flossing operation on the upper teeth, the grip on the handle by the user could be reversed with the thumb now being placed along the upper rib 20 and the fingers curled around toward the bottom side 15 or the holder can simply be inverted by twisting the wrist. The attachment of the floss and the use is essentially the same.

It should be noted that the dental floss holder of the present invention will accommodate either waxed or unwaxed floss as well as the wider dental tape. In some instances, when the spacing between teeth is especially great, it may be desirable to use several strands of floss in the holder. In such instances, the floss, prior to attachment to the holder, may be doubled over one or several times and then placed in the holder as described above.

The dental floss holder described herein is superior to prior holders in any number of respects. The shape of the device is aesthetically pleasing and functionally is especially adapted for its intended use. The handle is of a configuration that permits firm grasp and control of the holder in almost any position within the mouth, even those providing difficulty or awkard access.

An important advantage of the dental floss holder of the present invention is the means provided for securing and stringing the dental floss in the holder. Means for securing the ends of the floss are formed in the holder itself, not requiring any additional extending pieces that may break off or project outward as a possible source of injury to the user. The guide channels leading to the area of the grooves to the slots at the end of the prongs serve to simplify the attachment procedure and to assist in firmly securing the floss in the holder. The threading and winding of the floss in the holder is easily accomplished as it is a very natural motion to insert the floss in the slots and draw the ends along the channels and into the opposite groove in the handle. The floss once properly strung is securely engaged in the holder as discussed above. In summary, it will be seen that the present invention provides a dental floss holder for the manipulation of dental floss to make the flossing dental hygiene routine extremely convenient, effective, and more expedient.

Although one embodiment of the invention is illustrated in the drawings and described in the foregoing specification, it will be understood that the invention is not limited to the embodiment disclosed but is capable of change and modification without departing from the spirit and scope of the invention, which is only limited by the claims.

I claim:

1. A dental floss holder comprising:
   an elongate handle member having a shank portion at one end;
   a holder member joined to said handle member at said shank portion thereby forming a unitary structure, said holder member having two laterally spaced apart arms extending therefrom, said arms being provided with slots at their outer ends and adapted to permit dental floss to be strung therebetween;
   oppositely opposed groove means positioned in said shank portion subjacent each of said arms to receive and frictionally engage and securely anchor said dental floss as said dental floss is pulled into said groove means and wrapped around said groove means; and
   continuous guide channels extending along each of said arms from immediately adjacent the associated slot to a point immediately adjacent the associated groove means where said channels join whereby a predetermined length of dental floss can be strung between said arms by securing one end of said length in one of said oppositely opposed groove means, passing the free end of said length up through the opposite guide channel and through the slot associated therewith, across to the other said slot and downwardly through the other said guide channel and into the other of said oppositely opposed groove means where said free end of said length of dental floss is anchored by tightly pulling said free end and wrapping said free end around said oppositely opposed groove means.

2. The dental floss holder of claim 1 wherein said groove means are oppositely defined on one side by a rounded shoulder portion of the handle and on the other side by a relatively deep shoulder to facilitate engagement of floss therein.

3. The dental floss holder of claim 2 wherein said holder member is angularly disposed with respect to the longitudinal axis of said handle member.

4. The dental floss holder of claim 3 wherein said arms of said holder member form a generally U-shape and wherein said guide channels together form a generally U-shape and include a lip coextensive with said channels projecting from said holder member.

5. The dental floss holder of claim 4 wherein said lip and said channels form an acute angle therebetween.

6. The dental floss holder of claim 5 wherein each of said groove means is defined by a relatively deep shoulder portion of said handle at said shank portion and by the lower outer walls of said arms as the U-shaped arms tangentially converge with said shoulder portion of said handle.

7. The dental floss holder of claim 6 wherein said handle is formed having sides, top, and bottom forming a general trapezoidal cross-section.

8. The dental floss holder of claim 7 wherein said handle is provided with one or more longitudinal extending ribs thereon.

9. The dental floss holder of claim 8 wherein said holder is integrally formed of plastic.

* * * * *

UNITED STATES PATENT OFFICE
CERTIFICATE OF CORRECTION

PATENT NO. : 3,871,392
DATED : March 18, 1975
INVENTOR(S) : William Burnie Thomas It is certified that error appears in the above-identified patent and that said Letters Patent are hereby corrected as shown below:

Column 3, line 14, delete "form" and substitute therefor --fork--;

line 53, delete "flanges" and substitute therefor --flanged--.

Signed and sealed this 1st day of July 1975.

(SEAL)
Attest:

RUTH C. MASON
Attesting Officer

C. MARSHALL DANN
Commissioner of Patents
and Trademarks